R. OWEN.

Improvement in Whiffletree-Hook.

No. 128,244.            Patented June 25, 1872.

Witnesses:            Inventor:
B. R. Cowl            Ransom Owen
Alonzo Hughes            by his Attys
           A.H. & R.K. Evans

AM. PHOTO-LITHOGRAPHIC CO. N.Y. (OSBORNE'S PROCESS.)

UNITED STATES PATENT OFFICE.

RANSOM OWEN, OF PARKERSBURG, IOWA.

IMPROVEMENT IN WHIFFLETREE-HOOKS.

Specification forming part of Letters Patent No. 128,244, dated June 25, 1872.

*To all whom it may concern:*

Be it known that I, RANSOM OWEN, of Parkersburg, in the county of Butler and State of Iowa, have invented a new and improved hook for attaching the pulling gear to wheeled vehicles; and I hereby declare the following to be a full, clear, and exact description thereof, reference being had to the accompanying drawing making a part of this specification, in which—

Figure 1:
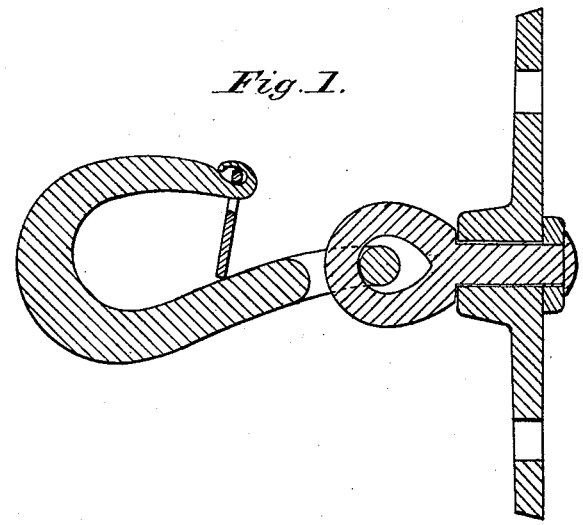
Figure 2:
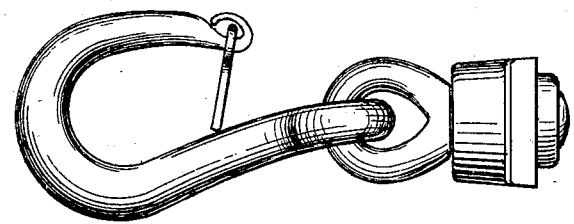

Figure 1 is a sectional elevation of my hook. Fig. 2 is a side elevation of the same.

My invention has for its object to provide a hook for attaching the pulling-gear to vehicles, thrashing-machines, plows, harrows, and other implements; and consists of a hook attached to a swivel working in a plate screwed to the double-tree or other part of the vehicle, the said hook having hinged at its point a tongue, which is sufficiently long to reach and rest against the shank of the hook, which prevents the tongue from opening any way, except inward toward the bow of the hook.

In the said drawing, A is a plate bolted to any part of the vehicle, to which the hook is to be attached, and through it runs a swivel, B. In the eye of the swivel is the eye of a hook, C, which has its point $c$ turned up forming a hinge. In this hinge works a tongue, D, it being of such a length as to touch the shank of the hook C in describing an arc from $c$ as a center. The point of contact between the shank and the tongue D is at $i$, so as to throw the tongue nearly at a perpendicular when the hook is extended.

The advantages of a hook constructed as mine over any of the various "snap" and any other hooks now used is apparent.

The operation of mine is automatic, and there is no highly-tempered metal required in making it; consequently, it is not easily broken in cold weather. When the strain is on the trace or single-tree, the hook is extended, and the tongue drops to $i$, and the means of egress for the trace or single-tree ring is closed, and no jolting process would be likely to pass it out. When the strain is taken off the hook it drops, as shown in the dotted lines, Fig. 1, the tongue falls into the bend of the hook, and the attaching-ring can be lifted out.

Having thus described my invention, what I claim as new, and desire to secure by Letters Patent, is—

Closing the opening between the shank and point of a hook by means of a tongue hinged to the point of the hook and coming in contact with the shank, for the purpose of preventing the ring through which the hook passes from dropping out.

RANSOM OWEN.

Witnesses:
J. BEEMER,
J. GOODALE.